United States Patent [19]

Summer et al.

[11] Patent Number: 5,311,357
[45] Date of Patent: May 10, 1994

[54] DEVICE FOR THE CREATION OF THREE-DIMENSIONAL IMAGES

[75] Inventors: Susan K. Summer, Warren, Conn.; Burkhard Katz, Overatz, Fed. Rep. of Germany

[73] Assignee: Image Technology Associates, New York, N.Y.

[21] Appl. No.: 985,592

[22] Filed: Dec. 3, 1992

[30] Foreign Application Priority Data

Jan. 28, 1992 [DE] Fed. Rep. of Germany ....... 4202303
Feb. 18, 1992 [DE] Fed. Rep. of Germany ....... 4204821
Aug. 26, 1992 [DE] Fed. Rep. of Germany ....... 4228451

[51] Int. Cl.$^5$ .......................... G02B 27/22; G02B 5/10
[52] U.S. Cl. ...................................... 359/479; 359/858
[58] Field of Search ............... 359/471, 472, 478, 479, 359/858

[56] References Cited

U.S. PATENT DOCUMENTS

| | | | |
|---|---|---|---|
| 922,722 | 5/1909 | Sallé | 352/88 |
| 995,607 | 6/1911 | Kempinski | 40/560 |
| 1,044,715 | 11/1912 | Wearn | 40/560 |
| 1,699,689 | 1/1929 | Curry | 40/132 |
| 2,112,314 | 3/1938 | Spandau | 40/132 |
| 2,215,396 | 9/1940 | Hoyt | 272/13 |
| 2,232,547 | 2/1941 | Mathias | 272/13 |
| 2,285,509 | 6/1942 | Goshaw | 178/5.8 |
| 2,570,147 | 11/1951 | Sauvage | 272/8 |
| 3,036,154 | 5/1962 | Harman | 178/7.91 |
| 3,048,654 | 8/1962 | Schade | 178/7.81 |
| 3,096,389 | 7/1963 | Dudley | 359/479 |
| 3,647,284 | 3/1972 | Elings | 350/294 |
| 3,661,385 | 5/1972 | Schneider | 272/8 M |
| 4,164,823 | 8/1979 | Marisco | 40/427 |
| 4,281,353 | 7/1981 | Scarborough, Jr. | 358/254 |
| 4,443,058 | 4/1984 | Bosserman | 350/294 |
| 4,491,872 | 1/1985 | Boldt et al. | 358/237 |
| 4,556,913 | 12/1985 | Van Breemen | 358/237 |
| 4,623,223 | 11/1986 | Kempf | 359/472 |
| 4,776,118 | 10/1988 | Mizuno | 40/219 |
| 4,802,750 | 2/1989 | Welck | 350/619 |
| 4,840,455 | 6/1989 | Kempf | 359/471 |
| 4,971,312 | 11/1990 | Weinreich | 272/8 |
| 5,004,331 | 4/1991 | Haseltine et al. | 350/443 |
| 5,148,310 | 9/1992 | Batchko | 359/479 |

FOREIGN PATENT DOCUMENTS 1154711 8/1962 Fed. Rep. of Germany.

*Primary Examiner*—Scott J. Sugarman
*Attorney, Agent, or Firm*—Gottlieb, Rackman & Reisman

[57] ABSTRACT

Apparatus for creating a three-dimensional image in space of an object. The device employs concave mirrors positioned in a unique arrangement with respect to one another so that the clarity and image produced therefrom is enhanced. Additionally, a videotape option allows a whole image to be broadcast and real objects merged with the broadcast image so that the entire combined image appears three-dimensional and realistic to a properly located observer.

7 Claims, 3 Drawing Sheets

DEVICE FOR THE CREATION OF THREE-DIMENSIONAL IMAGES

TECHNICAL FIELD

This invention relates to the production of optical images, and more particularly, to an improved apparatus to produce three-dimensional real optical images.

BACKGROUND OF THE INVENTION

Mirrored devices for creating images in space have been known in the art for many years. Typically, a concave mirror in one form or another is utilized to project an image of an object into space so that to an observer, it appears that a copy of the object is located in a nearby area of space. The copy of the object appears to be levitating in the air.

U.S. Pat. No. 3,647,284 to Ellings et al. issued on Mar. 7, 1972, is an example of the prior art. In the Ellings arrangement, a pair of concave mirrors are placed opposite one another. An object to be projected, such as a coin or piece of jewelry, is placed on a concave surface of one of the mirrors, which faces the concave surface of the other mirror. A real image of the object is then projected through a small opening in the surface of the other mirror.

U.S. Pat. No. 4,776,118 to Mizuno issued on Oct. 11, 1988, discloses another prior art device utilizing a concave mirror to project an image. In the Mizuno arrangement, a single concave mirror is utilized opposite a television monitor. The television monitor displays an image which is projected in a three-dimensional form, in an upright position, on a transparent surface above the device.

While the prior art provides numerous devices for projecting three-dimensional optical images, the images are in general not "faithful", i.e. not congruent or geometrically similar to the object and must be viewed from a precise angle in order to avoid extreme distortion.

Additionally, the prior art devices are not capable of producing images which appear to be located in an area of space far from the mirrored device.

Therefore, the limited systems of the prior art have not made possible the use of projected images to give the sensation of the presence of the object in a realistic environment. There exists a need for an improved image projecting device which will provide a large faithful three-dimensional image which may be used in numerous applications. Such applications include effects useful in advertising displays such as the sudden appearance, disappearance and change of scale of three-dimensional images.

SUMMARY OF THE INVENTION

The above limitations and other problems of the prior art are overcome in accordance with the present invention, which relates to an improved optical projection device. In accordance with the invention, two concave mirrors are utilized within a housing, and the housing contains a viewing hole along a vertical side thereof. The two concave mirrors are placed behind the viewing hole either 1) with their optical axes parallel to one another but offset or 2) forming a positive angle with respect to one another. The object to be projected is placed within the housing.

The mirrors are also positioned so that the optical axes of the first and second concave mirrors lie in the vertical median plane of the viewing hole. Preferably, the distance from the object to be projected to the surface of the second concave mirror is smaller than the focal length of the second concave mirror, thus producing a vertical image appearing behind the concave surface of the second concave mirror. (For a concave mirror that is a portion of a spherical surface the focal length is ½ the radius of the spherical surface.) This vertical image appears to be located at a distance from the first concave mirror greater than the focal length of the first concave mirror. This produces a real image appearing in front of the concave surface of the first concave mirror. By properly configuring the apparatus, the device produces a real optical image in space in front of the viewing hole outside of the housing.

In an optional enhanced embodiment, a television screen and videotape player are located behind one of the concave mirrors, said mirror being semi-transparent. An object is placed within the housing. The object is initially not illuminated, so that only an image of what is being played on the videotape player is projected. At a desired time, a light is switched on and causes the object to become illuminated and thus its real image is produced. This gives the appearance that the object is part of the image on the videotape.

DETAILED DESCRIPTION OF THE PREFERRED EMBODIMENT

Figure 1:
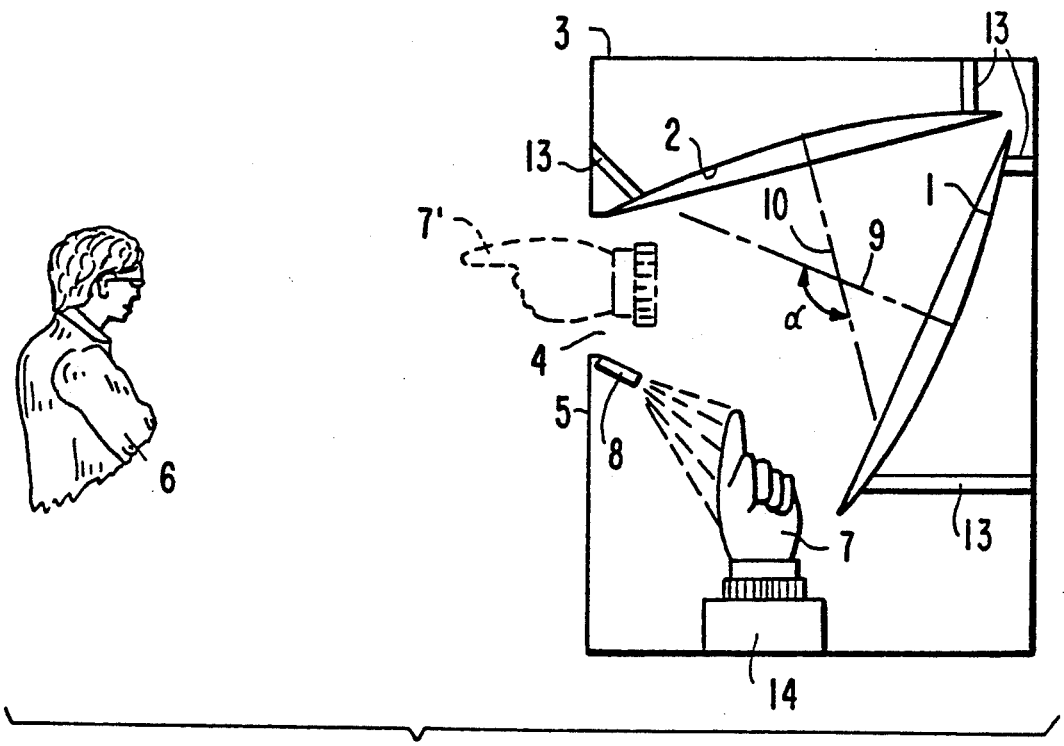
FIG. 1 shows a cross-sectional side view of a preferred embodiment of the invention.

FIG. 1 shows a first spherical concave mirror 1 and a second concave mirror 2 within a housing 3, both mounted on struts 13 running from the mirrors to the housing wall. The first concave mirror is visible to the observer through a circular viewing hole 4 in the front wall of the housing. In the lower area of the housing an object 7 is placed upon a stand 14. The object, in this example, is shown as a sculpture of a hand.

The second concave mirror 2 reflects the light from the object 7 and produces a vertical image behind (i.e. above) the concave surface of mirror 2.

There is a relation between the location of an object placed on the optical axis of a mirror to the image formed on the optical axis. If s is the distance of the object from the mirror and $s^1$ is the distance of the image from the mirror, then $$1/s + 1/s^1 = 1/f \qquad (1)$$

where f is the focal length of the spherical mirror. The focal length is ½ of the radius of curvature of the mirror. When $s<f$, equation (1) yields a negative value for $s^1$. Negative $s^1$ represents the distance along the optical axis to the virtual image that appears to be behind the mirror. The magnification of the object is defined to be the ratio of the image length to the object length transverse to the optical axis.

$$m = s^1/s. \qquad (2)$$

From equation (1) it can be seen that when $f>s>o-x<s^1<0$. This means that when the object is between the mirror and the focal point there is a virtual image behind the mirror. The magnification of the virtual image is $f/(f-s)$, so that with the image $1<m<x$ enlarging as the focal point is approached.

For $s>f$, i.e. an object placed more than a focal length from the mirror, the real image $$fs/(s-f)$$

is formed at more than a focal length from the mirror as well. The magnification is $f/(s-f)$ and the image is inverted.

In the present invention, the light forming the vertical image is reflected to the first concave mirror 1 so that the observer 6 sees a real image 7' created in front of the concave surface of the first concave mirror 1. In order to increase the contrast and enhance the image, the inner walls of housing 3 are black. Behind the front wall is a light source 8 which illuminates the object 7 as shown. The light source is placed such that the object 7 is fully illuminated and contrasts well against the dark walls of the housing 3. The light source 8 is also arranged so that only a minimal amount of light falls directly upon either one of the concave mirrors.

The mirrors 1 and 2 are arranged in a particular configuration in order to provide a real image 7' of the object 7 which is conveniently viewable by the observer 6. Specifically, the optical axes 9 and 10 of the concave mirrors 1 and 2, respectively, intersect each other at an angle $\alpha$ of approximately 135°. From this it follows that the planes of the edges of the spherical caps which form the concave mirrors meet at a dihedral angle of approximately 45°. This "opening angle" of the spherical areas between the concave mirrors can vary within approximately 10°. However, it is preferable that the angle be approximately 45° so that the real image formed by the first concave mirror 1 is projected in a horizontal direction towards the viewer.

The image 7' is also enlarged when compared with the object 7. For an object of about 20 centimeters in length, the radius of curvature of the concave mirrors should be approximately 100 centimeters and the focal length of the mirrors 50 centimeters.

In order for a virtual image of the object to appear in the second concave mirror, the distance from the object to the surface of the second mirror can not be greater than its focal length. The distance from the virtual image of the object to the surface of the second concave mirror 2 is always larger than the distance from the object to the surface of the second mirror 2, and approaches infinity when the object distance nears the focal length of the concave mirror 2. The enlargement of the virtual image is also proportionately greater, the further the object is from the surface of the concave mirror 2 and the enlargement becomes infinite as the object nears the focal length. The orientation of the virtual image in the concave mirror is the same as the orientation of a reflection in a flat mirror.

The location of the first concave mirror is chosen so that the distance from the virtual image in the second concave mirror 2 to the surface of the first concave mirror is greater than the focal length of the second concave mirror. As a result, a real image is created which is visible to the observer 6. The image 7' appears to the observer to be floating outside of the housing 3.

Figure 2:
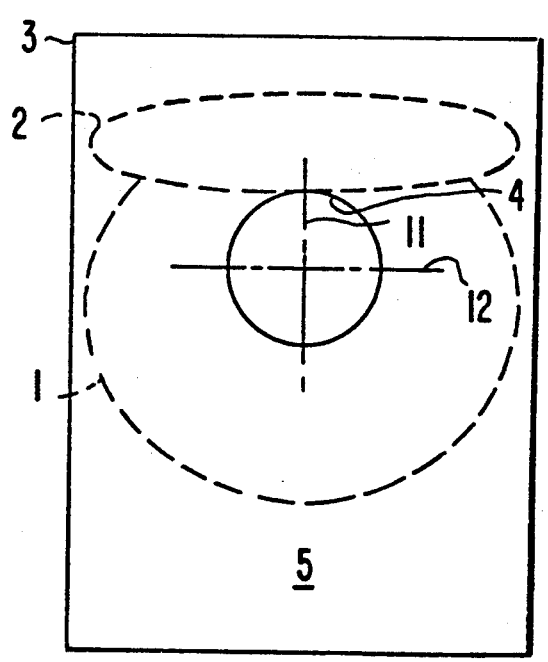
FIG. 2 is a front view of the device shown in FIG. 1 with the dot-and-dash lines showing the two concave mirrors.

In order to ensure that the image 7' appears outside of the housing, it is important that the optical axes 9 and 10 of the concave mirrors lie in the vertical median plane 11 of the viewing hole 4 as shown in FIG. 2. The horizontal median plane 12 is also shown in FIG. 2 for clarity.

Returning to FIG. 1, the concave mirrors are fastened to supports 13 within the housing 3. Additionally, the housing 3 should be stable and portable and the viewing hole in the front wall should be tightly sealable. The object shown as a hand 7 in FIG. 1 may be placed upon a pedestal or motor drive block 14. This object can be animated by the drive block 14 so that, for example, the hand opens or closes or it can be turned or moved towards and away from the second concave mirror. The image 7' carries out the same motions and thus appears lifelike to the observer 6. Remarkable optical effects can be created by having enlarged images appear to be floating in space and suddenly appearing or disappearing.

Figure 3:
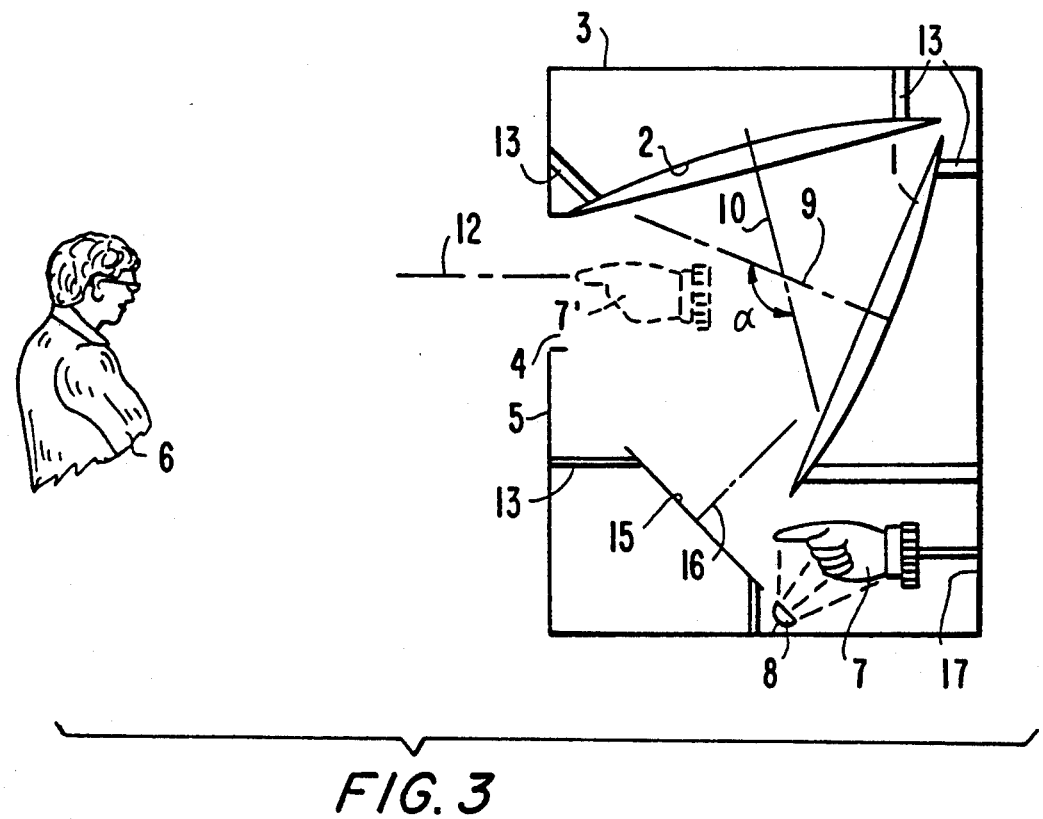
FIG. 3 is a side view of an alternative embodiment of the inventive device with an additional flat 45° angled mirror.

FIG. 3 shows a side view of another embodiment of the invention. The embodiment of FIG. 3 is similar to that of FIG. 1 but includes an angled flat mirror 15 for reflecting an image of the object 7. The flat mirror 15 is tilted at 45° with respect to the horizontal and points towards the back of housing 3.

The object 7 is placed horizontally in front of the surface of flat mirror 7. Through the flat mirror, the orientation of the object is rotated by 90° and the image 7' appears with the same vertical orientation as the object. This embodiment enables such effects as a live performer suddenly appearing on a stage. It is particularly advantageous when the object to be projected is that of a live human being inside a large housing. The image 7' of the human being would be upright rather than horizontal as in the embodiment of FIG. 1.

Figure 4:
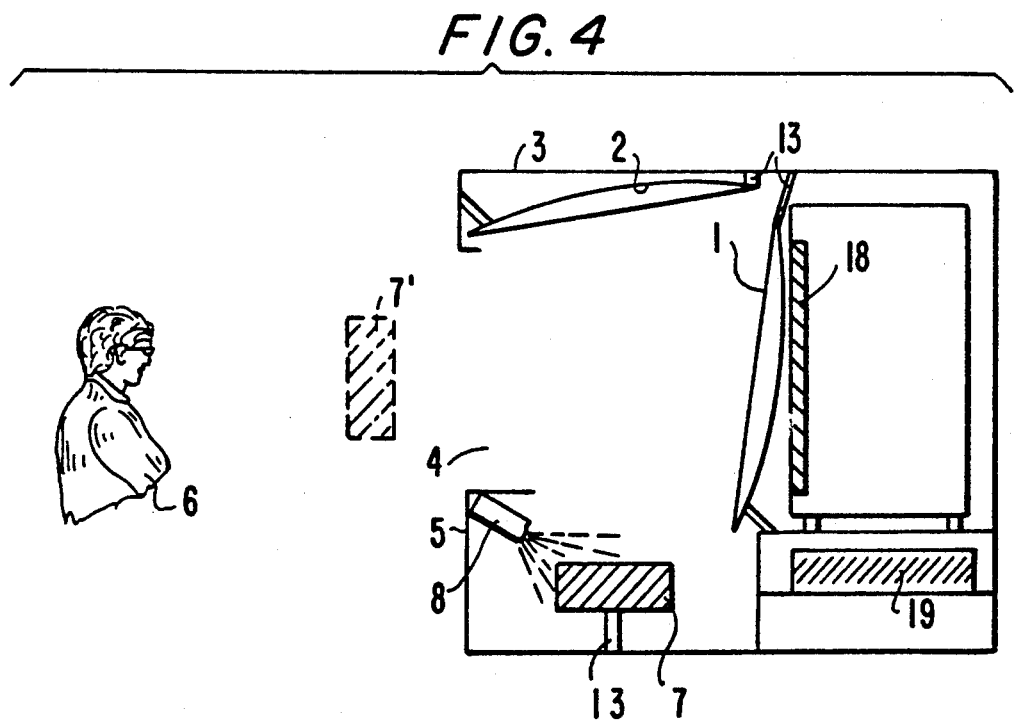
FIG. 4 is a side view of an alternative embodiment with a partially transparent first concave mirror and a video screen behind that mirror.

A still further embodiment of the invention is shown in FIG. 4. Here the surface of the first concave mirror 1 is partially transparent; i.e., it has a reflection percentage of 50%. A screen 18 is placed behind the surface of the first concave mirror 1 which is visible to the observer through the 50% transparent surface of the first concave mirror 1. In the design shown in FIG. 4, the screen is a television screen 18 and furthermore, the housing 3 contains a video recorder 7 which can play films on commercials.

The arrangement of FIG. 4 allows an advertisement to be broadcast to a projected image 7' in space in front of the housing 3. Additionally, pedestal 13 holds an object 7 proximate to an illuminating lamp 8. The object 7 may be simultaneously displayed with the image from the television screen and may even appear as a part thereof.

To enhance the effectiveness of the advertising projected from the screen into space, the illuminating lamp 8 is arranged with a timer such that it turns on at predetermined times during playing of the videotape player 19. The object 7 is visible to an observer only when the illuminating lamp 8 is on.

As an example, when a commercial for soda pop is playing and an actor in the commercial tosses a can of soda pop, the illuminating lamp 8 can be turned on while object 7 (a soda pop can) is moved. The can appears to actually fly out of the image 7'. Another example would be when a baseball is hit in a baseball game, a real baseball may be projected and moved from pedestal 13 so that it appears three-dimensional when the image 7' is viewed by an observer 6.

Figure 6:
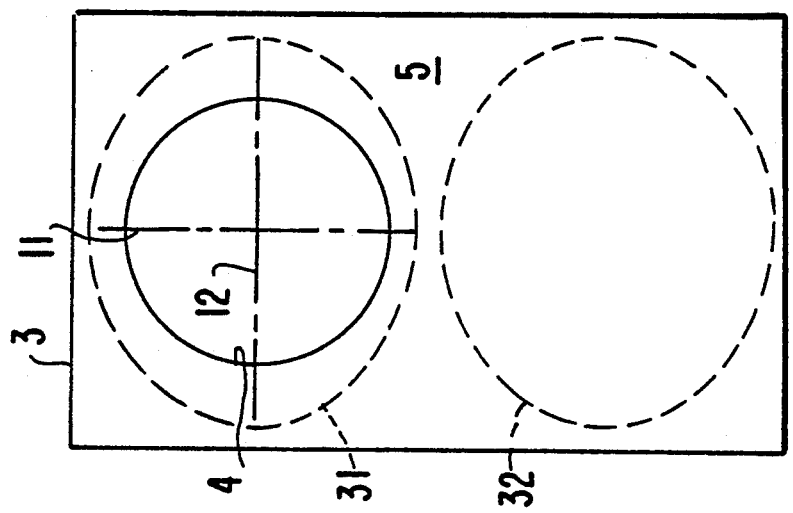
FIG. 6 shows a front view of the design depicted in FIG. 5, with dot-and-dash lines showing the two concave mirrors.
Figure 5:
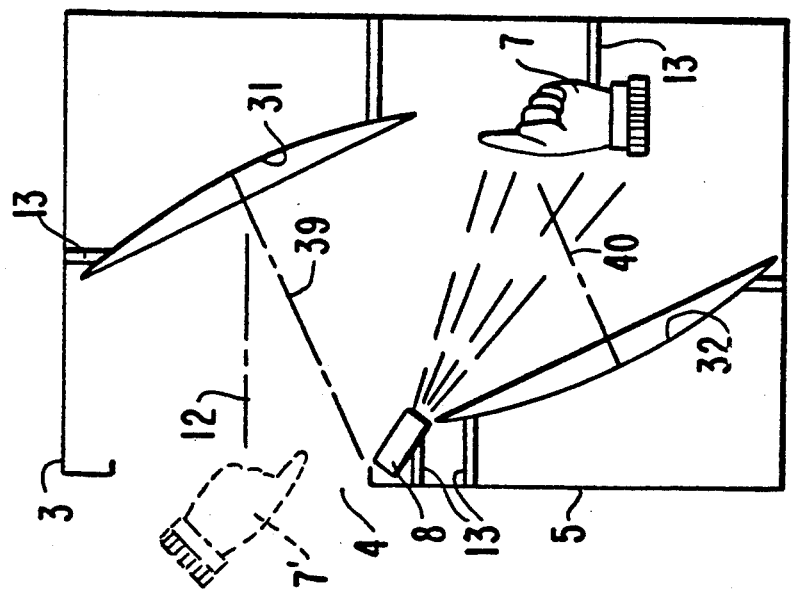
FIG. 5 depicts a side view of a still further embodiment of the invention having near parallel optical axis for the two mirrors.

FIGS. 5 and 6 depict views of another embodiment of the present invention. The two concave mirrors 31 and 32 are placed opposite and parallel to one another, with the optical axes both being below the horizontal median plane 12 of the viewing hole 4. The optical axes of the concave mirrors are parallel and tilt towards the horizontal median plane of the viewing hole 4. The planes of the mirrors are ideally tilted at an angle of 45° with respect to the horizontal. The distance of the areas of the first concave mirror 31 to the areas of the second concave mirror 32 are nearly constant and are approximately as large as the focal length of the first concave mirror 31. An image 7' appears downwardly tilted in the space in front of the viewing hole 4.

FIG. 6 is a view of the front wall of the device of FIG. 5 as well as, in dot and dash lines, the contours of the concave mirrors 31 and 32. As can be seen from FIG. 6, the projection of mirror 31 is substantially concentric with the viewing hole 4 while the projection of mirror 32 is below viewing hole 4. The device of FIGS. 5 and 6 can also be fitted with a partially transparent concave mirror and a monitor placed behind that mirror as previously described with respect to FIG. 4.

We claim:

1. A device for producing three-dimensional optical images of an object comprising:
    an outer housing having front and rear walls and a viewing hole through said front wall;
    support means for said object located within said housing;
    illuminating means within said housing, said illumination means providing rays of light to reflect off the object; and
    first and second concave mirrors positioned within said outer housing, said second concave mirror positioned to focus said rays of light to a virtual image formed by reflection from said second concave mirror, said first concave mirror positioned to reflect said rays reflected from said second concave mirror and to focus to a real image of said object said rays reflected from said second concave mirror, said concave mirrors being arranged to form an acute angle with respect to one another, and further being arranged such that the optical axes of each of said concave mirrors intersects a vertical plane passing through the center of said viewing hole, wherein said real image extends at least in part outside said housing and is magnified with respect to said object.

2. The device of claim 1 wherein said acute angle is 45°.

3. The device of claim 1 further comprising light means for illuminating an object within said housing.

4. The device of claim 1 further comprising a flat mirror arranged to reflect an object off of said first concave mirror.

5. The device of claim 1 wherein at least one of said concave mirrors is semi-transparent and wherein a moving picture is displayed behind said at least one concave mirror.

6. Apparatus for producing a combined image comprising:
    an outer housing having front and rear walls and a viewing hole through said front wall;
    a first semi-transparent concave mirror within said housing;
    a first item to be displayed behind said first semi-transparent mirror;
    a second concave mirror arranged to reflect a virtual image of said second item into said first semi-transparent concave mirror; and
    means for illuminating said second item at predetermined times.

7. Apparatus of claim 6 wherein said first item includes a moving picture displayed on a screen.

* * * * *